(12) United States Patent
Rachlin

(10) Patent No.: US 11,874,938 B2
(45) Date of Patent: Jan. 16, 2024

(54) ADMITTANCE MECHANISM

(71) Applicant: Honeywell International Inc., Morris Plains, NJ (US)

(72) Inventor: Elliott Harry Rachlin, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 84 days.

(21) Appl. No.: 16/949,549

(22) Filed: Nov. 3, 2020

(65) Prior Publication Data

US 2022/0138335 A1  May 5, 2022

(51) Int. Cl.
*G06F 21/00* (2013.01)
*G06F 21/62* (2013.01)
*G06F 9/4401* (2018.01)

(52) U.S. Cl.
CPC ........ *G06F 21/6218* (2013.01); *G06F 9/4403* (2013.01)

(58) Field of Classification Search
CPC .......................... G06F 21/6218; G06F 9/4403
See application file for complete search history.

(56) References Cited

U.S. PATENT DOCUMENTS

| | | | |
|---|---|---|---|
| 4,133,027 A | 1/1979 | Hogan | |
| 4,888,726 A | 12/1989 | Struger et al. | |
| 4,958,270 A | 9/1990 | McLaughlin et al. | |
| 5,088,021 A | 2/1992 | McLaughlin et al. | |
| 5,361,198 A | 11/1994 | Harmon et al. | |
| 5,432,927 A | 7/1995 | Grote et al. | |
| 5,546,301 A | 8/1996 | Agrawl et al. | |
| 5,933,347 A | 8/1999 | Cook et al. | |
| 5,963,448 A | 10/1999 | Flood et al. | |
| 6,008,985 A | 12/1999 | Lake et al. | |
| 6,088,679 A | 7/2000 | Barkley | |
| 6,138,049 A | 10/2000 | McLaughlin et al. | |
| 6,170,044 B1 | 1/2001 | McLaughlin et al. | |
| 6,272,386 B1 | 8/2001 | McLaughlin et al. | |
| 6,442,663 B1 | 8/2002 | Sun et al. | |
| 6,560,330 B2 | 5/2003 | Gabriel | |

(Continued)

FOREIGN PATENT DOCUMENTS

| CN | 103354190 A | 10/2013 |
|---|---|---|
| CN | 104241972 A | 12/2014 |

(Continued)

OTHER PUBLICATIONS

Indian Examination Report dated Apr. 11, 2022, issued in connection with corresponding Indian Application No. 202114041005 (8 pages total).

(Continued)

*Primary Examiner* — Joseph P Hirl
*Assistant Examiner* — Chi D Nguy
(74) *Attorney, Agent, or Firm* — John Maldjian, Esq.; Stevens & Lee PC

(57) ABSTRACT

One embodiment is a first computing system configured to control a second computing system, a software module configured to attempt to interact with the second computing system once the second computing system is brought to a first state by the first computing system, and an admittance mechanism configured to determine if the interaction is allowed to occur.

17 Claims, 5 Drawing Sheets

(56) References Cited

U.S. PATENT DOCUMENTS

| | | | |
|---|---|---|---|
| 7,237,148 B2 | 6/2007 | Czajkowski et al. | |
| 7,313,448 B2 | 12/2007 | Detrich et al. | |
| 7,434,047 B2 | 10/2008 | Sharma | |
| 7,436,797 B2 | 10/2008 | Shepard et al. | |
| 7,515,972 B2 | 4/2009 | Kumar et al. | |
| 7,555,752 B2 | 6/2009 | Groot et al. | |
| 7,577,575 B1 | 8/2009 | Donner et al. | |
| 7,630,777 B2 | 12/2009 | Rudnick et al. | |
| 8,280,530 B2 | 10/2012 | Kase | |
| 8,570,922 B2 | 10/2013 | Pratt, Jr. et al. | |
| 8,676,219 B2 | 3/2014 | Pratt, Jr. et al. | |
| 8,948,067 B2 | 2/2015 | Chernoguzov et al. | |
| 9,128,479 B2 | 9/2015 | Reichard et al. | |
| 9,665,089 B2 | 5/2017 | Schreder et al. | |
| 9,843,624 B1* | 12/2017 | Taaghol | H04L 41/0803 |
| 9,875,207 B2 | 1/2018 | Lv et al. | |
| 9,935,828 B2 | 4/2018 | Tal et al. | |
| 9,873,346 B2 | 5/2018 | McLaughlin et al. | |
| 9,990,286 B1 | 6/2018 | McLaughlin et al. | |
| 10,175,682 B2 | 1/2019 | Peake et al. | |
| 10,176,606 B2 | 1/2019 | Jammikunta et al. | |
| 10,178,177 B2 | 1/2019 | McLaughlin et al. | |
| 10,237,712 B2 | 3/2019 | Gopalakrishnan et al. | |
| 10,296,515 B2 | 5/2019 | Nikhra et al. | |
| 10,348,704 B2 | 7/2019 | Figueira | |
| 10,354,343 B2 | 7/2019 | Bodanapu et al. | |
| 10,441,832 B1 | 10/2019 | Trivelpiece et al. | |
| 10,565,046 B2 | 2/2020 | Tran et al. | |
| 10,997,113 B1 | 5/2021 | Reineke et al. | |
| 11,036,656 B2 | 6/2021 | Mclaughlin et al. | |
| 2003/0028538 A1 | 2/2003 | Eikenbery | |
| 2004/0158713 A1 | 8/2004 | Aneweer et al. | |
| 2004/0233237 A1 | 11/2004 | Randow | |
| 2005/0022065 A1 | 1/2005 | Dixon | |
| 2005/0022078 A1 | 1/2005 | Subramanian | |
| 2005/0276233 A1 | 12/2005 | Shepard et al. | |
| 2006/0130021 A1 | 6/2006 | Plum et al. | |
| 2006/0236198 A1 | 10/2006 | Lintz et al. | |
| 2007/0100472 A1 | 5/2007 | Johnson et al. | |
| 2008/0015714 A1 | 1/2008 | Rudnick et al. | |
| 2008/0074998 A1 | 3/2008 | Becker et al. | |
| 2008/0120125 A1 | 5/2008 | Chavez | |
| 2009/0031403 A1 | 1/2009 | Huang | |
| 2009/0222654 A1 | 9/2009 | Hum et al. | |
| 2010/0064137 A1 | 3/2010 | Mcgrew et al. | |
| 2010/0271989 A1 | 10/2010 | Chernoguzov et al. | |
| 2010/0315298 A1 | 12/2010 | Biswas et al. | |
| 2011/0178611 A1 | 7/2011 | Daraiseh et al. | |
| 2011/0258433 A1 | 10/2011 | Pulini et al. | |
| 2012/0076092 A1 | 3/2012 | Nelson | |
| 2012/0078391 A1 | 3/2012 | Zornio et al. | |
| 2012/0117416 A1 | 5/2012 | Mclaughlin | |
| 2012/0300420 A1 | 11/2012 | Muldowney et al. | |
| 2013/0268799 A1 | 10/2013 | Mestery et al. | |
| 2014/0032366 A1 | 1/2014 | Spitz et al. | |
| 2014/0068579 A1 | 3/2014 | Dawson et al. | |
| 2014/0173246 A1 | 6/2014 | Sandstrom | |
| 2014/0173336 A1 | 6/2014 | Bennah et al. | |
| 2014/0245077 A1 | 8/2014 | Kanso et al. | |
| 2014/0298091 A1 | 10/2014 | Carlen et al. | |
| 2015/0018977 A1 | 1/2015 | Law et al. | |
| 2015/0019191 A1 | 1/2015 | Maturana et al. | |
| 2015/0149767 A1 | 5/2015 | Oualha et al. | |
| 2015/0154136 A1 | 6/2015 | Markovic et al. | |
| 2015/0215300 A1 | 7/2015 | Buonacuore et al. | |
| 2015/0278144 A1 | 10/2015 | McLaughlin et al. | |
| 2015/0323910 A1 | 11/2015 | McLaughlin et al. | |
| 2015/0341364 A1* | 11/2015 | Basso | G06F 16/00 711/108 |
| 2015/0378356 A1 | 12/2015 | Hefeeda et al. | |
| 2016/0062350 A1 | 3/2016 | Prall et al. | |
| 2016/0103431 A1 | 4/2016 | Ganapathi et al. | |
| 2016/0139999 A1 | 5/2016 | Gabler et al. | |
| 2016/0299497 A1 | 10/2016 | Mclaughlin et al. | |
| 2016/0320759 A1 | 11/2016 | Macha et al. | |
| 2016/0327923 A1 | 11/2016 | Papenbreer et al. | |
| 2017/0126404 A1 | 5/2017 | Unagami et al. | |
| 2017/0185055 A1 | 6/2017 | Nakajima et al. | |
| 2017/0199515 A1 | 7/2017 | Bhat et al. | |
| 2017/0228225 A1 | 8/2017 | Rachlin | |
| 2017/0277607 A1 | 9/2017 | Samii et al. | |
| 2017/0300024 A1 | 10/2017 | Nixon et al. | |
| 2017/0359222 A1 | 12/2017 | Dutta et al. | |
| 2018/0046487 A1 | 2/2018 | Matters et al. | |
| 2018/0121843 A1* | 5/2018 | Connely, IV | G16H 10/60 |
| 2018/0259923 A1 | 9/2018 | De et al. | |
| 2018/0299873 A1 | 10/2018 | Chauvet et al. | |
| 2018/0321662 A1 | 11/2018 | Nixon et al. | |
| 2018/0324609 A1 | 11/2018 | Diancin | |
| 2018/0364673 A1 | 12/2018 | Van et al. | |
| 2019/0042378 A1 | 2/2019 | Wouhaybi et al. | |
| 2019/0050342 A1 | 2/2019 | Drayton | |
| 2019/0056719 A1 | 2/2019 | Ong | |
| 2019/0102226 A1 | 4/2019 | Caldato et al. | |
| 2019/0104437 A1 | 4/2019 | Bartfai-Walcott et al. | |
| 2019/0140989 A1 | 5/2019 | Wise et al. | |
| 2019/0174207 A1 | 6/2019 | Cella et al. | |
| 2019/0179678 A1 | 6/2019 | Banerjee et al. | |
| 2019/0245716 A1 | 8/2019 | Coombes et al. | |
| 2019/0274084 A1 | 9/2019 | Daniels et al. | |
| 2019/0324874 A1 | 10/2019 | Gill et al. | |
| 2019/0340269 A1 | 11/2019 | Biernat et al. | |
| 2019/0370118 A1 | 12/2019 | Salapura et al. | |
| 2020/0012569 A1 | 1/2020 | Natanzon et al. | |
| 2020/0026575 A1 | 1/2020 | Guim et al. | |
| 2020/0029086 A1 | 1/2020 | Zou et al. | |
| 2020/0103861 A1 | 4/2020 | Flood | |
| 2020/0104153 A1 | 4/2020 | Shibayama et al. | |
| 2020/0127411 A1 | 4/2020 | Pakimo et al. | |
| 2020/0136943 A1 | 4/2020 | Banyai et al. | |
| 2020/0236162 A1 | 7/2020 | Bouzon et al. | |
| 2020/0253067 A1 | 8/2020 | Pakimo et al. | |
| 2020/0310394 A1 | 10/2020 | Wouhaybi et al. | |
| 2020/0313960 A1 | 10/2020 | Rosa-Bian et al. | |
| 2020/0319623 A1 | 10/2020 | Mclaughlin et al. | |
| 2020/0333765 A1 | 10/2020 | Biernat et al. | |
| 2021/0096759 A1* | 4/2021 | Thakkilapati | G06F 3/0659 |
| 2021/0152495 A1 | 5/2021 | Craig et al. | |
| 2022/0138335 A1 | 5/2022 | Rachlin | |

FOREIGN PATENT DOCUMENTS

| | | |
|---|---|---|
| CN | 109522051 A | 3/2019 |
| EP | 0416891 A2 | 3/1991 |
| EP | 2184903 A1 | 5/2010 |
| EP | 3789834 A1 | 3/2021 |
| GB | 2404261 A | 1/2005 |
| WO | 9423367 A1 | 10/1994 |
| WO | 2011041413 A1 | 4/2011 |
| WO | 2015169352 A1 | 11/2015 |
| WO | 2017064560 A1 | 4/2017 |
| WO | 2019227401 A1 | 12/2019 |

OTHER PUBLICATIONS

Wikipedia, "DNA Rail"; Retrieved from "https://en.wikipedia.org/w/index.php?title=DIN_rail&oldid=946791884", Retrieved on: Sep. 23, 2020 (4 pages total).

"Everything You Need to Know About DIN Rails", RS Components, downloaded Apr. 21, 2020, https://uk.rs-online.com Retrieved on: Sep. 23, 2020 (5 pages total).

Honeywell, High-Performance Process Manager Planning, HP02-500, Release 530, CE Compliant, Revision 05—Mar. 20, 1998 (330 pages total).

Arnold Offner, "DIN-RAIL in the Electrical Control Cabinet and Junction Box", Presented on Nov. 12, 2008 at the IEEE SC2 Committee Meeting in Tucson, Arizona. (13 pages total).

"DeltaV™ Virtualization—High Availability and Disaster Recover", DeltaV Distributed Control System, Whitepaper, Emerson Process Management, Oct. 2014 (10 pages total).

(56) References Cited

OTHER PUBLICATIONS

Extended European Search Report dated Mar. 10, 2022 issued in connection with corresponding EP Application No. 21195635.4 (18 pages total).
Extended European Search Report dated Mar. 21, 2022 issued in connection with corresponding EP Application No. 21205397.9 (9 pages total).
Cheatham, Jason A., John M. Emmert, and Stan Baumgart. "A survey of fault tolerant methodologies for FPGAs." ACM Transactions on Design Automation of Electronic Systems (TODAES) 11, No. 2 (2006): 501-533. (Year: 2006) (33 pages total).
T. Panhofer and M. Delvai, "Self-Healing Circuits for Space-Applications," 2007 International Conference on Field Programmable Logic and Applications, Amsterdam, Netherlands, 2007, pp. 505-506, doi: 10.1109/FPL.2007.4380701. (Year: 2007) (2 pages total).
M. R. Boesen, J. Madsen and D. Keymeulen, "Autonomous distributed self-organizing and self-healing hardware architecture— The eDNA concept," 2011 Aerospace Conference, Big Sky, MT, USA, 2011, pp. 1-13, doi: 10.1109/AERO.2011.5747476. (Year: 2011) (13 pages total).
C Popa and A. Stan, "A self-healing single core architecture using dynamically reconfigurable devices," 2012 16th International Conference on System Theory, Control and Computing (ICSTCC), Sinaia, Romania, 2012, pp. 1-6 (Year 2012) (6 pages total).
G. D. Mois, M. Hulea, S. Folea and L. Miclea, "Self-healing capabilities through wireless reconfiguration of FPGAs," 2011 9th East-West Design & Test Symposium (EWDTS), Sevastopol, Ukraine, 2011, pp. 22-27, doi: 10.1109/EWDTS.2011.6116410. (Year: 2011) (6 pages total).
M. Balaz and S. Kristofik, "Generic Self Repair Architecture with Multiple Fault Handling Capability," 2015 Euromicro Conference on Digital System Design, Madeira, Portugal, 2015, pp. 197-204, doi: 10.1109/DSD.2015.118. (Year 2015) (8pages total).
Yu-jen Huang, Da-ming Chang and Jin-fu Li, "A Built-In Redundancy-Analysis Scheme for Self-Repairable RAMs with Two-Level Redundancy," 2006 21st IEEE International Symposium on Defect and Fault Tolerance in VLSI Systems, Arlington, VA, USA, 2006, pp. 362-370, doi: 10.1109/DFT.2006.6. (Year: 2006) (9 pages total).
A. Alzahrani and R. F. DeMara, "Fast Online Diagnosis and Recovery of Reconfigurable Logic Fabrics Using Design Disjunction," in IEEE Transactions on Computers, vol. 65, No. 10, pp. 3055-3069, Oct. 1, 2016, doi: 10.1109/TC.2015.2513762. (Year: 2016) (15 pages total).
Vierhaus, Heinrich Theodor. "Combining fault tolerance and self repair in a virtual TMR scheme." In 2013 Signal Processing: Algorithms, Architectures, Arrangements, and Applications (SPA), pp. 12-18. IEEE, 2013. (Year: 2013) (7 pages total).
T. Koal, H. T. Vierhaus and D. Scheit, "A Concept for Logic Self Repair," 2009 12th Euromicro Conference on Digital System Design, Architectures, Methods and Tools, Patras, Greece, 2009, pp. 621-624, doi: 10.1109/DSD.2009.238. (Year: 2009) (4 pages total).
C. Gleichner, T. Koal and H. T. Vierhaus, "Effective logic self repair based on extracted logic clusters," Signal Processing Algorithms, Architectures, Arrangements, and Applications SPA 2010, Poznan, Poland, 2010, pp. 1-6. (Year: 2010) (6 pages total).
M.B. Tahoori, "High Resolution Application Specific Fault Diagnosis of FPGAs," in IEEE Transactions on Very Large Scale Integration (VLSI) Systems, vol. 19, No. 10, pp. 1775-1786, Oct. 2011, doi: 10.1109/TVLSI.2010.2056941. (Year: 2011) (12 pages total).
"Experion CEE-based Controllers and I/O Overview, Doc # EP03-290-400, Release # 400", Jul. 2010, Version 1.0 (retrieved from https://www.nexinstrument.com/assets/images/pdf/TK-PR.pdf on Sep. 4, 2020) (43 pages total).
Australian Examination Report dated Sep. 1, 2022, issued in connection with corresponding AU application No. 2021229183 (3 pages total).
European Examination Report dated Feb. 11, 2022, issued in connection with corresponding EP Application No. 20165415.9 (10 pages total).
Extended European Search Report dated Jul. 9, 2021 for corresponding EP Application No. 21164736.7 (8 pages total).
Extended European Search Report dated Aug. 20, 2021, issued in connection with corresponding European Patent Application No. 21165382.9 (10 pages total).
Extended European Search Report dated Jul. 27, 2020, issued in connection with corresponding European Patent Application No. 20165416.7 (9 pages total).
Extended European Search Report dated Jun. 29, 2021, issued in connection with corresponding European Patent Application No. 21156993.4 (8 pages total).
Extended European Search Report dated Nov. 18, 2021, issued in connection with corresponding European Patent Application No. 21177860.1 (8 pages total).
Extended European Search Report dated Oct. 23, 2020, issued in connection with corresponding European Patent Application No. 20180113.1 (8 pages total).
Extended European Search Report dated Sep. 21, 2021, issued in connection with corresponding European Patent Application No. 21164739.1 (8 pages total).
Indian Examination Report dated Feb. 14, 2022; issued in connection with corresponding Indian Application No. 202114012845 (7 pages total).
Indian Examination Report dated Feb. 7, 2022; issued in connection with corresponding Indian Application No. 202114013519 (6 pages total).

* cited by examiner

ADMITTANCE MECHANISM

CROSS-REFERENCE TO RELATED APPLICATIONS

This application incorporate by reference in its entirety, application Ser. No. 16/377,237 entitled "CONTROL HIVE ARCHITECTURE ENGINEERING EFFICIENCY FOR AN INDUSTRIAL AUTOMATION SYSTEM", filed Apr. 7, 2019 (hereinafter referred to as the "HIVE Patent").

BACKGROUND

An admittance mechanism uses a series of rules to govern the admittance of "items" into "item-holders". Items may be anything. One example of an item is a computer program which can be put into a computer. Rules enable the proper placement of items into item-holders such that a series of placement criteria are not violated.

In industrial applications items of software are used to perform control functions on computing devices (item-holders). This could occur in a refinery, a paper mill, or a power plant, for example. Moreover, some of the industrial installations are difficult or costly to access and may also be dangerous and/or their operation is critical. A computer that controls a gas distribution facility or an electric power plant are two examples. In systems like these, faults are expected over time and computers can either malfunction, break, and/or need maintenance periodically. In these scenarios, an admittance mechanism would be useful, for example, to restore normal operation to the computer, without human intervention.

SUMMARY OF THE INVENTION

One embodiment is a first computing system configured to control a second computing system, a software module configured to attempt to interact with the second computing system once the second computing system is brought to a first state by the first computing system, and an admittance mechanism configured to determine if the interaction is allowed to occur.

Another embodiment includes one or more hardware-based non-transitory memory devices storing computer-readable instructions which, when executed by the one or more processors disposed in a computing device, cause the computing device to cause an item-holding module to be brought to a first state by a controller, receive a request for access by an item module for an item-holding module, determine with an admittance mechanism whether the item module can access the item-holding module by applying a plurality of rules in a dynamic rule-based system, wherein if the item module violates one of the plurality of rules, the access is not allowed to occur.

Another embodiment includes a device, which comprises a controller configured to control a computing device and to bring the computing device to an initial state in a computing system, an application configured to interact with the controller in order to attempt to access the computing device, and an admittance device configured to use a plurality of rules associated with the computing system, to determine whether the access between the application and the computing device can occur, wherein if the application violates one of the plurality of rules, the interaction is not allowed to occur.

DETAILED DESCRIPTION OF THE INVENTION

Figure 1:
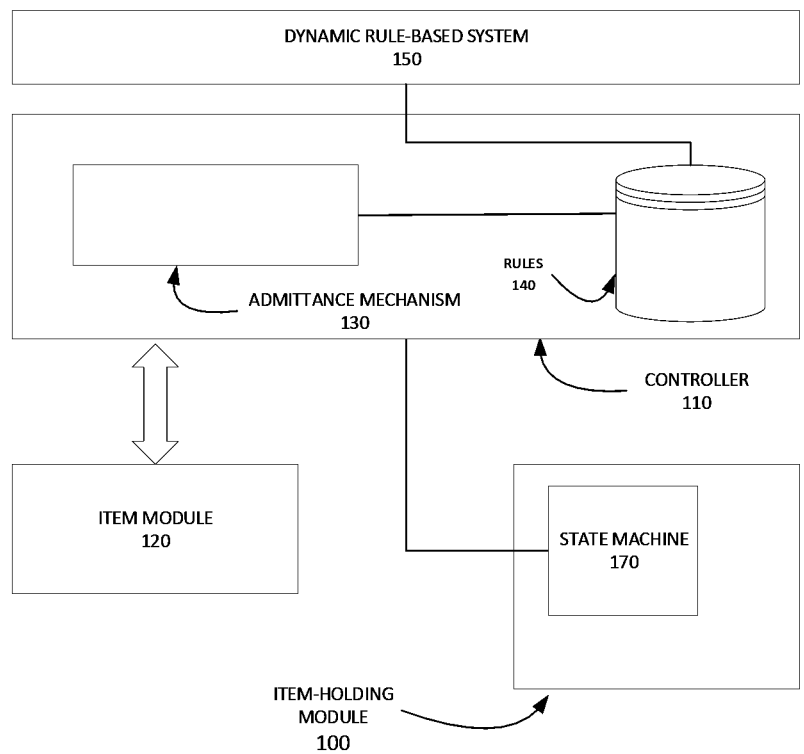
FIG. 1 is a diagram of a system that can employ an admittance mechanism.

FIG. 1 is a diagram of a system that can employ an admittance mechanism. The system includes an item module 120, an item-holding module 100, and a controller 110, which operate in a dynamic rule-based system 150. One example of such a system 150 is described in more detail with respect to the HIVE Patent. In such a system, rules can be added and removed as needed, for example by using tags associated with the rules. A HIVE Orchestrator or other controller, such as controller 110, can be used. The controller 110 can apply the rules to determine at the current time, whether interactions between devices, systems, software and the like can occur.

The controller 110 has an admittance mechanism 130 and a plurality of rules 140. The controller 110 is coupled to the dynamic rule-based system 150, and each has access to the rules 140. The item-holding module 100 includes a state machine 170 which represents the state of the item holding-module 100. This could include a state that indicates the item-holding module 100 was rebooted or brought to an initial state, for instance. The controller 110 is connected to the item-holding module 100 and can perform actions to change the state of the item-holding module 100, which in turn is reflected by state machine 170.

Figure 2:
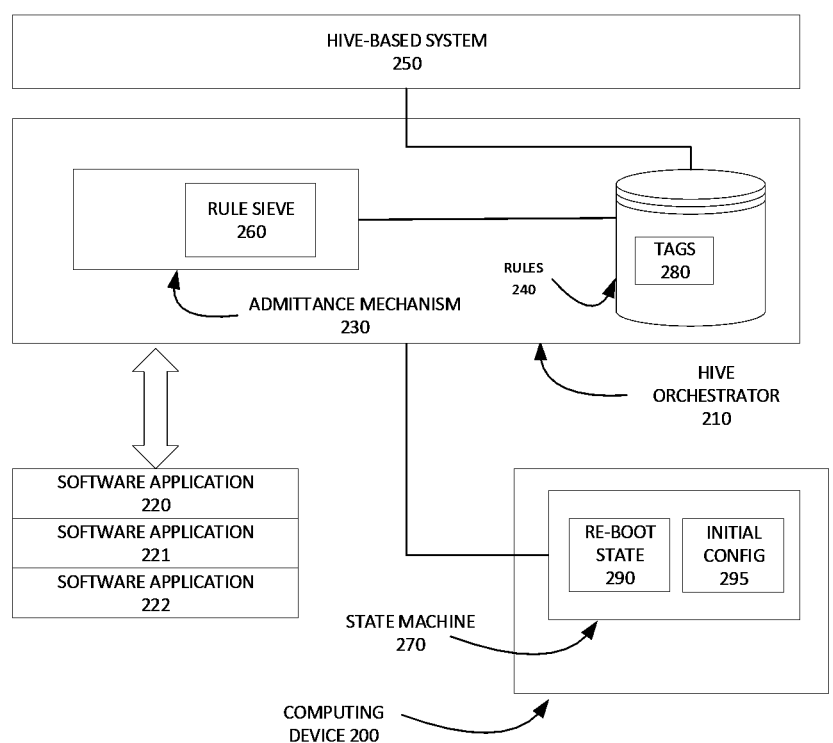
FIG. 2 is a diagram of another system that can employ the admittance mechanism.

FIG. 2 is a diagram of a system that can employ an admittance mechanism. The system includes software applications 220, 221, and 222, a computing device 200, and a HIVE Orchestrator 210, which operate in a HIVE based system 250. See, for example, the HIVE patent for more details. The HIVE Orchestrator 210 can apply a plurality of rules 240 to determine at the current time, whether interactions between devices, systems, software and the like can occur.

The HIVE Orchestrator 210 has an admittance mechanism 230 coupled to the plurality of rules 240. The HIVE Orchestrator 210 is coupled to the dynamic rule-based system 250, and each has access to the rules 240. The computing device 200 includes a state machine 270 which represents the state of the computing device 200. In this example, the state machine 270 has a reboot state 290 and an initial configuration state 295, although a plurality of other states are possible as well. The HIVE Orchestrator 210 is connected to the state machine 270 and can perform actions to change the state of the computing device 200 including bringing the computing device to its initial configuration or re-booting the computing device 200.

The HIVE Orchestrator 210 is further capable of determining where items are placed, such as those provided by applications 220-222. The rules 240 include a plurality of tags 280. The HIVE Orchestrator 210 is capable of adding or removing tags 280 associated with each of the rules 240.

In this manner, a rule can be activated, de-activated, or modified in a dynamic manner as the system's needs change, and the HIVE Orchestrator 210 can determine at any given moment whether an item can be placed in an item-holder, such as computing device 200. In one embodiment, the admittance mechanism 230 receives in sequence, items that are proposed for insertion. With respect to FIG. 2, this includes receiving the requests from software applications 220, 221, and 222 in order, to place items in computing device 200. It should be understood that other embodiments include a single application making multiple requests to the computing device 200 and applications requesting to place items on other computing devices (not shown).

In operation, as the admittance mechanism 230 has a rule sieve 260. The rule sieve 260 receives in sequence, items that are proposed for insertion, it will determine whether or not the item can be put into the item-holder. One example of how to make this determination includes: 1) each proposed item (e.g., from software applications 220, 221, and 222) and each item-holder (computing device 200) is scrutinized by each rule 240; 2) if the proposed item and item-holder combination violates even one of the rules, then the admittance is denied; and 3) If the proposed admittance does not violate any of the rules, then the admittance is permitted.

The rules 240 can include any types of rules that can be used in a computing environment. Some examples of the rules 240 that can be used by the HIVE Orchestrator 210 are shown with respect to Table 1:

TABLE 1

| Name | Syntax | Description |
|---|---|---|
| ASSIGN | ASSIGN <specific-item> to <specific-item-holder> | This means that the specific item <specific-item> can only be placed in one item-holder, namely <specific-item-holder>, if anywhere. No other placement is valid. |
| TOGETHER | TOGETHER <specific-item-1> <specific-item-2> <specific-item-3> . . . <specific-item-N> | This means that all named specific items must be placed in the same specific-item-holder. |
| APART | APART <specific-item-1> <specific-item-2> <specific-item-3> . . . <specific-item-N> | This means that all named specific items must be placed in the different specific-item-holders. No two specific-items may be placed in the same specific-item-holder |
| MAX_1 | MAX_1 <specific-item-1> <specific-item-2> <specific-item-3> . . . <specific-item-N> | This means that no more than 1 of the listed specific-items may be put into any single specific item holder. |
| MAX_2 | MAX_2 <specific-item-1> <specific-item-2> <specific-item-3> . . . <specific-item-N> | This means that no more than 2 of the listed specific-items may be put into any single specific item holder. |
| MAX_3 | MAX_3 <specific-item-1> <specific-item-2> <specific-item-3> . . . <specific-item-N> | This means that no more than 3 of the listed specific-items may be put into any single specific item holder. |

Table 1 is a partial list of possible rules according to one embodiment. Additional rules can be added to the rules 240 as needed by the system.

Figure 3:
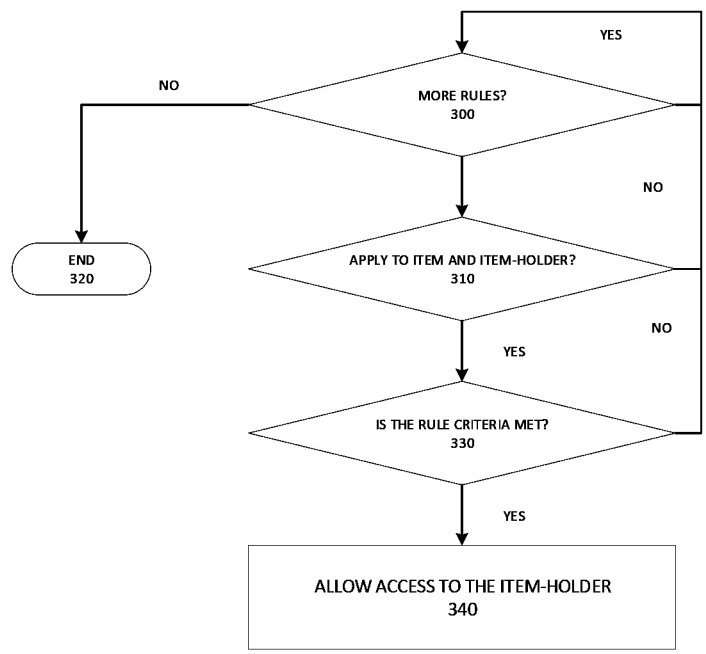
FIG. 3 is a flowchart that illustrates the application of rules by the admittance mechanism.

FIG. 3 is a flowchart that illustrates the application of rules by the admittance mechanism. At step 300 each rule is scrutinized until there are no more rules left at which time the process ends at block 320. When there is a rule to process, the system determines at step 310 is the rule applies to the current item and item-holder. If not, the process repeats at step 300 and the next rule is scrutinized (if any). If the rule applies to the current item and item-holder at step 310, then at step 330, the system determines if the criteria for the rule is met. For example, the rule could be APART and it could require that the current item not be included in the item-holder if a specific other item is in that item-holder already. (See, Table 1 for more examples). If the rule criteria is not met at step 330 the access to the item-holder is prevented and the process repeats at step 300 where the next rule is analyzed. If the rule criteria is met, then access to the item-holder is granted to the item at step 340.

Figure 4:
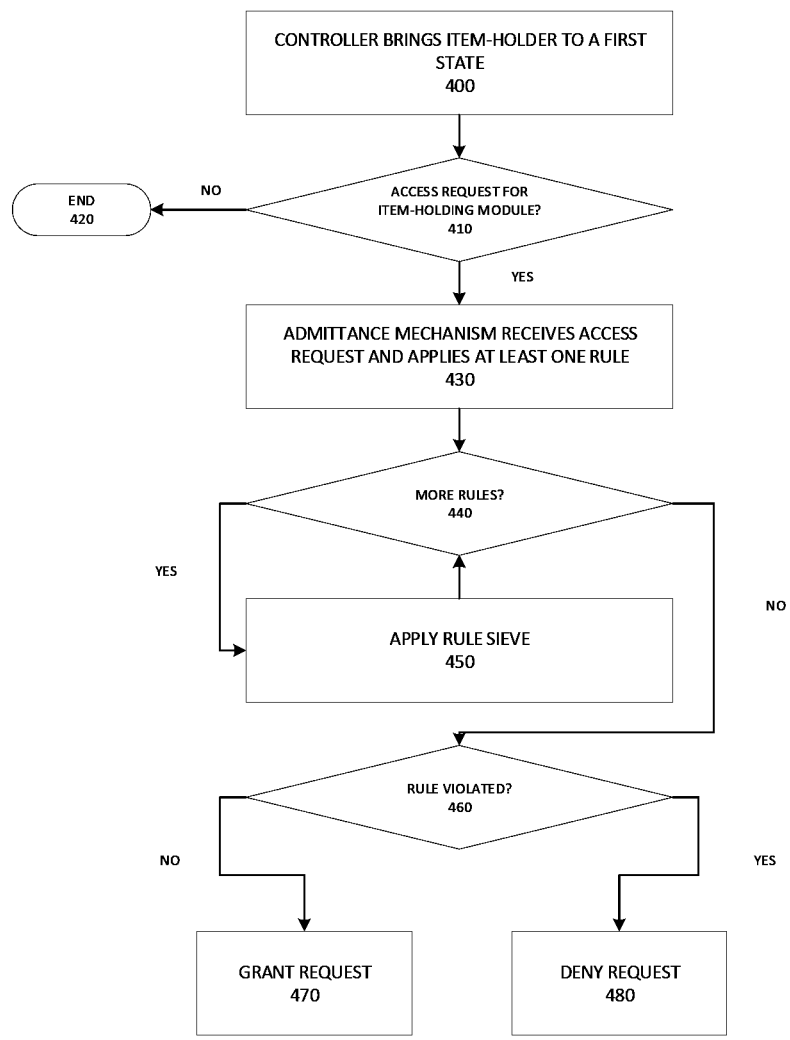
FIG. 4 is a flowchart that illustrates another application of rules by the admittance mechanism.

FIG. 4 is a flowchart that illustrates the application of rules by the admittance mechanism. At step 400, a controller brings an item-holder to a first state. The first state could be, for example, a result of the controller re-booting the item-holder. Alternatively, the first state could be a result of the controller bringing the item-holder to an initial configuration. Thereafter, at step 410 the controller waits for an access request from an item-holding module. In practice, any plurality of item-holding modules may be communicating with the controller to place items therein, however, the current example traces a single request for the sake of clarity.

If there are no requests at step 410, the process ends at step 420. When a request occurs, an admittance mechanism receives the request at step 430. At step 440, the admittance mechanism determines if there are rules to apply to the current access request. If so, the rule is applied to a rule sieve at step 450. Thereafter, the process repeats at step 440. When there are no more rules, the system determines at step 460 if any of the rules have been violated. If any rule was violated at step 460, the request is denied at step 480. Alternatively, is none of the rules were violated at step 460, then the request can be granted at step 470.

Figure 5:
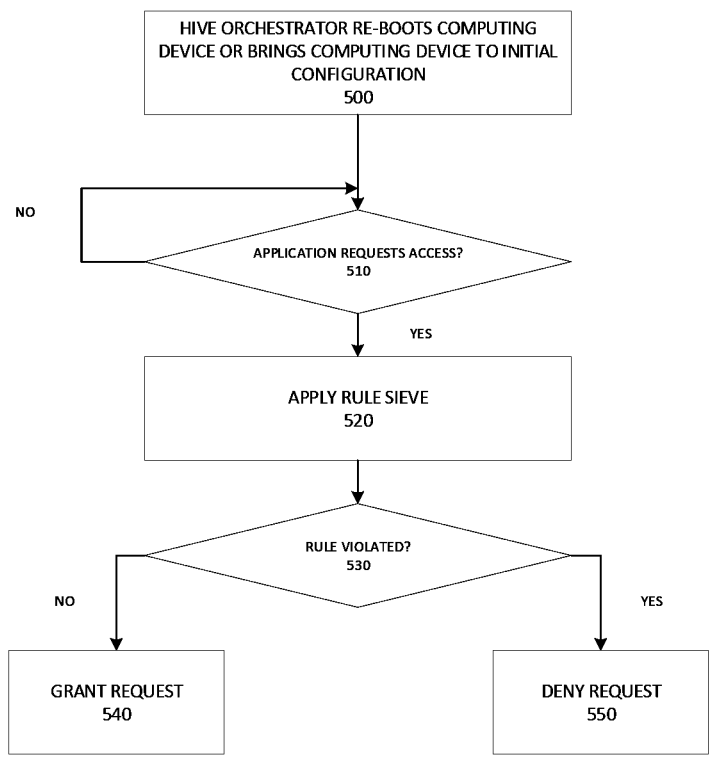
FIG. 5 is a flowchart that illustrates another application of rules by the admittance mechanism. Should FIGS. 3, 4, and 5 have the same caption?

FIG. 5 is a flowchart that illustrates the application of rules by the admittance mechanism. At step 500, a HIVE Orchestrator brings a computing device to a first state. The first state could be for example, a re-boot state or an initial configuration. In many applications, including industrial applications, and others, it is routine for a controller such as a HIVE Orchestrator to bring a computing device to such a state as a part of the devices life cycle, either to be repaired, maintained, or otherwise brought to the first state.

Once the device is brought to the first state, the system determines whether an application is requesting access to the computing device at step 510. If not, the system waits until such a request is made, if any. Once an application is requesting access to the computing device (e.g., to place an item there), a rule sieve is applied to the request at step 520. Thereafter, at step 530, the system determines whether any of the rules were violated. If any rule was violated at step 530, the request is denied at step 550. Alternatively, if none of the rules were violated at step 530, then the request can be granted at step 570.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   a first computing system configured to control a second computing system;
   a software module configured to attempt to interact with the second computing system once the second computing system is brought to a first state by the first computing system; and
   an admittance mechanism configured to use a plurality of rules in a dynamic rule-based system, to determine whether the interaction between the software module and the second computing system can occur, wherein if the software module violates at least one of the plurality of rules, the interaction is not allowed to occur;
   wherein the plurality of rules is selected from a group consisting of assign, together, apart, max 1, max 2, max 3, and max n.

2. The system of claim 1, wherein the first state is an initial configuration or a configuration after a re-boot.

3. The system of claim 1, wherein the dynamic rule-based system includes a plurality of tags wherein a tag can be used to activate or inactivate any of the plurality of rules.

4. The system of claim 1, wherein the admittance mechanism includes a rule-based sieve.

5. The system of claim 1, wherein the first computing system includes a HIVE Orchestrator.

6. One or more hardware-based non-transitory memory devices storing computer-readable instructions which, when executed by the one or more processors disposed in a computing device, cause the computing device to:
   cause an item-holding module to be brought to a first state by a controller;
   receive a request for access by an item module for an item-holding module;
   determine with an admittance mechanism whether the item module can access the item-holding module by applying a plurality of rules in a dynamic rule-based system, wherein if the item module violates one of the plurality of rules, the access is not allowed to occur;
   wherein the plurality of rules is selected from a group consisting of assign, together, apart, max 1, max 2, max 3, and max n.

7. The one or more hardware-based non-transitory memory device of claim 6, wherein the first state is an initial configuration or a configuration after a re-boot.

8. The one or more hardware-based non-transitory memory devices of claim 6, wherein the dynamic rule-based system includes a plurality of tags wherein a tag can be used to activate or inactivate any of the plurality of rules.

9. The one or more hardware-based non-transitory memory devices of claim 6, wherein the admittance mechanism includes a rule-based sieve.

10. The one or more hardware-based non-transitory memory devices of claim 6, wherein the controller includes a HIVE Orchestrator.

11. A device comprising:
    a controller configured to control a computing device and to bring the computing device to an initial state in a computing system;
    an application configured to interact with the controller in order to attempt to access the computing device; and
    an admittance device configured to use a plurality of rules associated with the computing system, to determine whether the access between the application and the computing device can occur, wherein if the application violates one of the plurality of rules, the interaction is not allowed to occur;
    wherein the plurality of rules is selected from a group consisting of assign, together, apart, max 1, max 2, max 3, and max n.

12. The device of claim 11, wherein the initial state is an initial configuration or a configuration after a re-boot.

13. The device of claim 11, wherein the rules include a plurality of tags.

14. The device of claim 11, wherein the admittance device includes a rule-based sieve.

15. The device of claim 11, wherein the controller includes a HIVE Orchestrator.

16. The device of claim 13 wherein one of the tags is used to activate one of the plurality of rules.

17. The device of claim 13 wherein one of the tags is used to de-activate one of the plurality of rules.

* * * * *